(12) United States Patent
Robichez

(10) Patent No.: US 6,791,978 B1
(45) Date of Patent: Sep. 14, 2004

(54) SWITCHING NETWORK FOR MULTIPLE CHANNEL INSTALLATIONS

(75) Inventor: Sabine Robichez, Toulouse (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/402,251

(22) PCT Filed: Feb. 4, 1999

(86) PCT No.: PCT/FR99/00238

§ 371 (c)(1),
(2), (4) Date: Oct. 1, 1999

(87) PCT Pub. No.: WO99/40739

PCT Pub. Date: Aug. 12, 1999

(30) Foreign Application Priority Data

Feb. 5, 1998 (FR) ............................................. 98 01338

(51) Int. Cl.[7] .............................................. H04L 12/50
(52) U.S. Cl. ...................................... 370/360; 370/380
(58) Field of Search ............................... 370/389, 395.1, 370/387, 388, 386, 380, 360, 362

(56) References Cited

U.S. PATENT DOCUMENTS

| | | | | |
|---|---|---|---|---|
| 4,145,573 A | * | 3/1979 | Arnold | |
| 4,425,639 A | * | 1/1984 | Acampora et al. | |
| 4,792,963 A | * | 12/1988 | Campanella et al. | 375/109 |
| 5,764,587 A | * | 6/1998 | Buettner et al. | |
| 6,188,686 B1 | * | 2/2001 | Smith | 370/388 |

FOREIGN PATENT DOCUMENTS

| | | |
|---|---|---|
| DE | 25 38 656 A1 | 3/1977 |
| EP | 0 211 541 A2 | 2/1987 |
| EP | 0599 734 A1 | 6/1994 |
| EP | 0 690 636 A1 | 1/1996 |
| EP | 0 749 174 A1 | 12/1996 |
| FR | 2 752 497 A1 | 2/1998 |

* cited by examiner

*Primary Examiner*—Kenneth Vanderpuye
(74) *Attorney, Agent, or Firm*—Sughrue Mion, PLLC

(57) ABSTRACT

Switch network for connecting one of N input ports and one of T output ports, the network comprising an arrangement of switches.

Each switch comprises at least one first terminal (E1, for example), to which a first port of a first type (an input port, for example) is connected, a second terminal (S2, for example), to which a second port of a second type (output, in this example) is connected, and a contact bridge (24) provided with an actuation device and which on command makes a connection between said first and second terminals. This network comprises a plurality of network terminals each constituting at least one first terminal (E1) for a first switch (E1, 22, S3) and one first terminal for a second switch (E1, 21, S1).

3 Claims, 1 Drawing Sheet

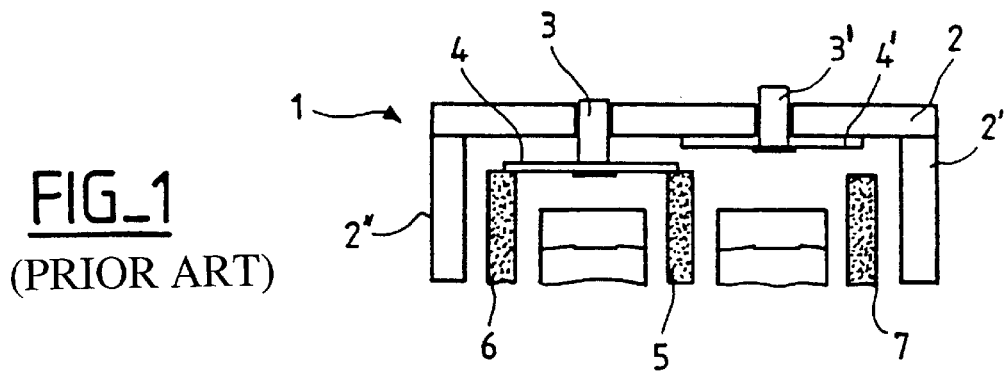
FIG_1 (PRIOR ART)
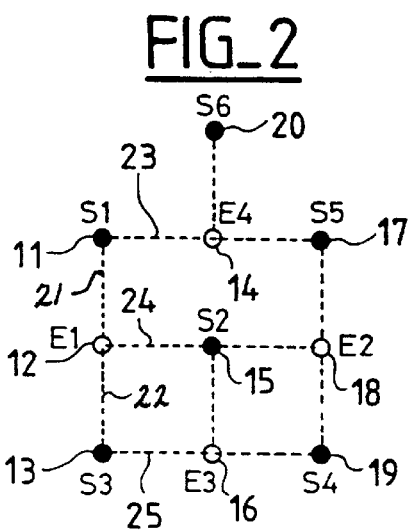
FIG_2
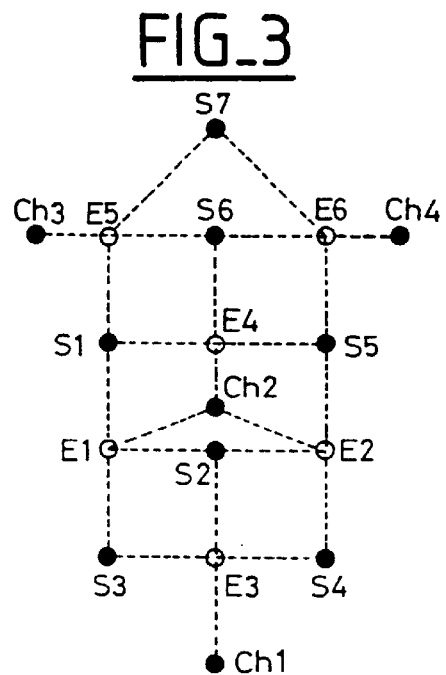
FIG_3
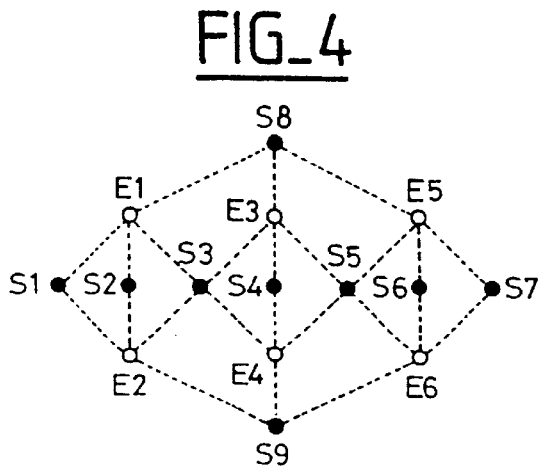
FIG_4
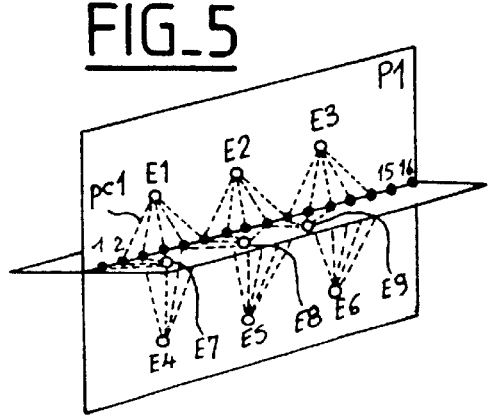
FIG_5

SWITCHING NETWORK FOR MULTIPLE CHANNEL INSTALLATIONS

BACKGROUND OF THE INVENTION

The present invention relates to a switch network for multichannel installations, such as those found in telecommunications satellites, between the antenna ports and the amplifiers, for example.

Such networks must connect one of N input ports (antenna ports, in the example considered later) and one of t output ports (amplifier ports, in the example considered later).

To be more precise, the network must provide P such connections, with P less than or equal to both N and T. This is because there may be redundancy, in the construction of the satellite, both with regard to the antennas and with regard to the amplifiers. In determining each of the P connections between one of the elements of a set consisting of P out of N input ports and one of the elements of a set consisting of P out of T output ports, it is sufficient for each of the P input ports to be connected to a different one of the P output ports. If one of P output ports has to be replaced by another of the T-P previously unused output ports, the switch network must be such and controlled in such a way that only a limited number of connections already set up are modified.

Numerous switch networks meeting these demands are known per se, and those disclosed in patent document EP-0599734-A1 will be cited by way of example, comprising individual 4-pole switches having two opposite ports which can be connected to one another, or each to an adjacent port to the right, or each to an adjacent port to the left. Such networks include a relatively large number of such switches. Because of the technology employed, the switches are heavy and bulky.

The invention starts from switches using a different technology, illustrated by patent documents EP-0670579-A1 and EP-0211541-A2. The switch from the first of these two documents comprises two terminals between which is a movable contact piece driven by an electromagnet. The switch from the second document comprises a central terminal surrounded by a circle of radial terminals, a contact piece being provided between the central terminal and each of the radial terminals. Networks such as the one from document EP-0599734-A1 mentioned above could use such switches. The advantages and restrictions resulting from the change of technology would thereby be obtained, but the drawbacks resulting directly from the relatively high number of switches in a network characterized by given numbers N/P/T would remain.

SUMMARY OF THE INVENTION

The invention is aimed at a solution which substantially reduces the remaining drawbacks just mentioned, that is to say a switch network for connecting one of N input ports and one of T output ports, said network comprising an arrangement of switches and being characterized, according to the invention, in that each switch comprises at least one first terminal to which a first port of a first type (an input port, for example) is connected at least one second terminal, to which a second port of a second type (an output port, in this example) is connected, and a contact bridge provided with an actuation device and which on command makes a connection between said first and second terminals, and in that said network comprises a plurality o f net work terminals each constituting at least one of said first terminals for a first switch of said network and one of said first terminals for a second switch of said network.

Said plurality of network terminals preferably comprises a matrix with one of said terminals at each node.

In one embodiment, said plurality of network terminals comprises at least two matrices with one of said terminals at each node, network terminals of one matrix being connected to network terminals of another matrix.

BRIEF DESCRIPTION OF THE DRAWING

The various aims and features of the invention will become more clearly apparent in the light of the following description of embodiments of the invention, the description being given with reference to the appended figures, in which:

FIG. 1 is a simplified representation of a prior art switch from which the switch network of the present invention is derived, FIG. 2 shows a first embodiment of a switch network according to the invention, FIG. 3 shows a second embodiment of a switch network according to the invention, FIG. 4 shows a third embodiment of a switch network according to the invention, FIG. 5 shows a fourth embodiment of a switch network according to the invention.

DETAILED DESCRIPTION OF THE INVENTION

FIG. 1 represents diagrammatically a prior art switch 1. It is, for example, a version of the switch from document EP-0211541-A2 with only two radial terminals; it essentially comprises a housing 2, 2', 2" impermeable to electromagnetic radiation with plungers 3, 3' actuating contact bridges 4, 4' which bear on network terminals 5, 6, 7. Of course, portions of said housing that are not shown close around extensions of said network terminals.

The network terminal 5 is connected to an input port of a network comprising the switch from FIG. 1, the terminals 6 and 7 are connected to output ports of this network and the relevant switch connects the input port connected to the terminal 5 to the output port connected to the terminal 6, when the contact bridge 4 is lowered by the plunger 3. In another configuration of the network comprising the switch 1, the contact bridge 4' can connect the input port terminal 5 to the output port terminal 7 instead of the output port terminal 6.

FIG. 2 represents an example of a switch network according to the invention built up of switches such as those just described with reference to FIG. 1 and to the previously mentioned documents. It should however be pointed out that the invention is not limited to this embodiment and that the networks described below with reference to FIGS. 2 to 5 could equally well be built up of switches using different technologies, semiconductor electronic switches, for example, as long as they comprise terminals and contact bridges and are functionally equivalent to the switch from FIG. 1.

Returning to FIG. 2, network terminals 11 to 20 are represented by circles which are either white when the terminal E1, E4, E3, E2 is connected to an input port or black when the terminal S1, S3, S2, S5, S4, S6 is connected to an output port. These terminals are arranged in a matrix with one terminal at each node. When they are actuated, that is to say lowered, as in the case of the contact bridge 4 of FIG. 1, the contact bridges 21, to 25 each connect a terminal of an in port to a terminal of an output port, E1-S1, E1-S3, E4-S1, E1-S2, E3-S3, etc. These contact bridges are represented by dashed lines; others are also represented, although for simplicity they are not identified by reference numerals. As may be seen in FIG. 2, the network in accordance with the invention comprises four input port terminals E1 to E4 and six output port terminals S1 to S6. Each input port terminal E1 to E4 accesses three output port terminals. This network is designed to establish four connections. This implies that two output port terminals will be excluded from these four connections. As each input port terminal accesses three output port terminals, each input port terminal can always be connected to an output port terminal. For example, in one of the least favorable cases, where the output port terminals S1 and S2 are excluded, the following connections are still possible: E1-S3, E3-S4, E2-S5, E4-S6.

FIG. 3 represents a switch network similar to that from FIG. 2, and in which the same elements retain the same references numerals, at least as regards the input port terminals and the output port terminals. Bigger than the previous one, this network comprises inputs E1 to E6 which can be connected to outputs S1 to S7 and is such that five connections can be made. Since each input terminal is connected to at least three output terminals, as in the case of FIG. 2, this poses no problem. Moreover, this network comprises loads Ch1, Ch2, Ch3, Ch4. An input terminal which is not connected to an output terminal (there is always one such terminal) must be connected to a load. The input terminals E3, E5, E6 can therefore be individually connected to the loads Ch1, Ch3, Ch4. The input terminals E1, E2, E4 can be individually connected to a load Ch2. It is clear that the inputs E3, E5, E6 could likewise share a common load.

Constructed in the same manner as the previous ones, the network of FIG. 4 comprises inputs E1 to E6 and outputs S1 to S9. It is designed to make six connections. As each input can access four outputs, such as E1-S1/S2/S3/S8 or E4-S3,/S4/S5/S9, it can easily be shown that excluding three outputs does not prevent each input from being connected individually to an output.

The network of FIG. 5 is constructed in a similar way to those of FIGS. 3 and 4, but the terminals of the switch network are laid out in a three-dimensional network. This is because, in a plane P1, inputs E1 to E6 can be connected by contact bridges such as pc1 to outputs from among a set of 16 outputs S1 to S16. For example, the input E1 can be connected to the outputs S2 to S6, the input E2 can be connected to outputs S6 to S10 and the other inputs of the plane P1 are likewise each connected to a group of five outputs. Similarly, inputs E7 to E12, in a plane P2, of which only the inputs E7 to E9 are visible, are also each connected to a group of five outputs. The outputs are distributed across the inputs so that each output can be connected to a limited number of inputs, minimizing the number of terminals of the network, which thus comprises 12 input port terminals, 16 output port terminals and at most 60 contact bridges (12 inputs times five bridges per input).

From the point of view of networks based on the type of switch illustrated by FIG. 1, it is clear that two-dimensional networks such as those of FIGS. 2 to 5 can be produced in the form of an integrated structure in which the terminals are arranged at certain nodes of a matrix grid. As a consequence, certain contact bridges (E5-S7, for example, FIG. 3, or E1-S8, FIG. 4) will have a different length. The number of different lengths of contact bridge can of course be minimized and the switch network can be modular, and so this does not constitute a genuine drawback.

The switch network from FIG. 5 requires two planes, each similar to those just described, whose common terminals of like rank (S1 to S16) are respectively connected to one another. More generally, the invention relates to networks comprising at least two matrices with one terminal at each node, network terminals of one matrix being connected to network terminals of another matrix.

What is claimed is:

1. A switch network for connecting one of N input ports and one of T output ports, said network comprising an arrangement of switches and being characterized in that each switch comprises at least one first terminal (E1) to which a first port of a first type is connected, at least one second terminal (S2), to which a second port of a second type is connected, and a contact bridge (24) provided with an actuation device and which on command makes a connection between said first and second terminals, in that said network comprises a plurality of network terminals each constituting at least one of said first terminals (E1) for a first switch (E1, 22, S3) of said network and one of said first terminals for a second switch of said network (E1, 21, S1), and in that said plurality of network terminals comprises a matrix with one of said terminals at each node of said matrix.

2. The switch network according to claim 1, characterized in that said plurality of network terminals comprises at least two matrices with one of said terminals at each node, network terminals of one matrix being connected to network terminals of another matrix.

3. The switch network according to claim 1, wherein said first port is an input port, and said second port is an output port.

\* \* \* \* \*